United States Patent [19]

Butcher

[11] Patent Number: 5,953,082
[45] Date of Patent: Sep. 14, 1999

[54] ELECTRO-OPTICAL ACTIVE MASKING FILTER USING SEE THROUGH LIQUID CRYSTAL DRIVEN BY VOLTAGE DIVIDER PHOTOSENSOR

[76] Inventor: Roland Butcher, 102 Colin St., West Perth, Australia, 6005

[21] Appl. No.: 08/875,635

[22] PCT Filed: Jan. 18, 1996

[86] PCT No.: PCT/AU96/00023

§ 371 Date: Jul. 17, 1997

§ 102(e) Date: Jul. 17, 1997

[87] PCT Pub. No.: WO96/22559

PCT Pub. Date: Jul. 25, 1996

[30] Foreign Application Priority Data

Jan. 18, 1995 [AU] Australia ............... PN 0613
May 25, 1995 [AU] Australia ............... PN 3165
Oct. 6, 1995 [AU] Australia ............... PN 6182

[51] Int. Cl.$^6$ .................................................. G02F 1/136
[52] U.S. Cl. ............................................ 349/13; 349/24
[58] Field of Search ........................ 349/13, 14, 11, 349/17, 16, 25, 24; 250/227.29, 227.2, 201.1, 204, 205, 201.9, 229, 201.5, 208.6, 214.1; 359/239, 299, 240, 242, 259, 316; 396/241, 246, 262, 234, 249, 457, 213; 706/40

[56] References Cited

U.S. PATENT DOCUMENTS

| | | | |
|---|---|---|---|
| 3,944,817 | 3/1976 | Hilsum et al. | 250/229 |
| 4,272,186 | 6/1981 | Plummer | 355/34 |
| 4,480,269 | 10/1984 | Yoshida et al. | 358/209 |
| 4,655,554 | 4/1987 | Armitage | 349/28 |
| 4,693,561 | 9/1987 | Ashley | 349/28 |
| 4,760,437 | 7/1988 | Denker et al. | 706/40 |
| 4,976,536 | 12/1990 | Vogeley et al. | 353/77 |
| 5,051,570 | 9/1991 | Tsujikawa et al. | 250/201.1 |
| 5,168,378 | 12/1992 | Black et al. | 349/195 |
| 5,268,679 | 12/1993 | Shannon | 345/4 |
| 5,331,149 | 7/1994 | Spitzer et al. | 250/221 |
| 5,541,762 | 7/1996 | Levy | 359/240 |
| 5,638,119 | 6/1997 | Cornuejois | 348/229 |
| 5,729,010 | 3/1998 | Pinkus et al. | 313/524 |

FOREIGN PATENT DOCUMENTS

| | | | |
|---|---|---|---|
| 2016156 | 4/1979 | United Kingdom | G03B 17/12 |
| 2255465 | 4/1992 | United Kingdom | H04N 5/243 |

OTHER PUBLICATIONS

Derwent Abstract No. 88–081107/12, Class V07, JP, A, 63033969 (Fuji Xerox KK) Feb. 13, 1988.
Abstract of 2–1832 A, Class G03B7, JP, Koichi Taka, (Image Controller Jan. 8, 1990.
Abstract of 62–198834 A, Class G03B7, JP, Masakazu Taku, (Exposure Correcting Device) Sep. 2, 1987.
Abstract of 3–220878 A, Class H04N5, JP, Shuji Hisatomi, (Automatic Exposure Correcter) Sep. 30, 1991.
Abstract of 56–113120 A, Class G03B7, JP, Kaoru Onodera, (Photographic Device) Sep. 5, 1981.
Abstract of 63–130271 A, Class B23K9, JP, Yusuke Sato, (Welding Monitoring Device) Jun. 2, 1988.
Abstract of 61–113374 A, Class H04N5, JP, Hiroshi Hara, (Cry Display Image Pickup Device) May 31, 1986.

*Primary Examiner*—William L. Sikes
*Assistant Examiner*—Kenneth Parker
*Attorney, Agent, or Firm*—Michael Best & Friedrich LLP

[57] ABSTRACT

An electro-optical filter (22) typically for use in a still or video camera (10). The camera (10) is provided with a lens (14) for focusing an image of the subject (12) onto focal plane (16) of the camera (10). A recording medium is placed at the focal plane (16). Light emanating or reflected from the subject (12) travels in an optical path (20) through lens (14) and onto the focal plane (16). Located in the optical path (20) between the subject (12) and the focal plane (16) is the electro-optical filter (22). The electro-optical filter (22) comprises a matrix of independent cells (24) on which respective portions of the subject image impinge. Each cell has a transmissibility dependent on the intensity of the portion of the impinging subject image so that each portion of subject image is independently filtered by the cell (24) on which it impinges. The filtered subject image comprises the ensemble of filtered subject image portions and can be captured or viewed at the focal plane (16).

7 Claims, 4 Drawing Sheets

ELECTRO-OPTICAL ACTIVE MASKING FILTER USING SEE THROUGH LIQUID CRYSTAL DRIVEN BY VOLTAGE DIVIDER PHOTOSENSOR

FIELD OF THE INVENTION

The present invention relates to an electro-optical filter for an image capture or viewing device, and in particular, but not exclusively, to an electro-optical filter for modifying the contrast range of light emanating from a subject prior to capture or viewing of an image of that subject.

BACKGROUND OF THE INVENTION

There are many reasons why the ability to control the contrast characteristics of a subject image at the time of image capture is desirable, on both a technical as well as an aesthetic level. There has been many endeavours to control or modulate the contrast characteristics of a live subject image during image capture in a recording device. Liquid crystal filters have been described for modulating the subject image to reduce contrast and improve pick-up quality for example in JP 2-1832 (MATSUSHITA) and GB 2,255,465 (SONY). These patents describe multiplexed signal addressing of a filter matrix, and largely concentrate on the use of a beam splitting prism or partial mirror directing a sample subject image onto a separate sensor array to pick up a drive signal.

Although proposing an effective contrast modulating systems for a camera, the systems described in these prior art patents have several practical limitations. For example, the use of beam splitters or partial mirrors limits the amount of light which can reach a recording or viewing medium. Additionally, as it is only the portion of the light reflected by the prism or partial mirror which is acted upon by sensors, rather than the whole amount of available light, the overall system sensitivity and fidelity is reduced. A further disadvantage is the bulk, voltage requirement and overall expense of these systems.

As a result of the above disadvantages, to this day, systems such as those referred to above, do not appear to have gained commercial acceptance nor wide practical use.

SUMMARY OF THE INVENTION

It is an object of the present invention to provide an electro-optical filter for filtering an image prior to capture or viewing which is small, compact and easy to manufacture at a low cost.

According to a first aspect of the present invention there is provided an electro optical filter adapted for location in an optical path between a subject and a focal plane for capture or viewing of an image of said subject, said filter comprising:

a matrix of independent cells on which respective portions of said subject image impinge, each cell having a transmissibility which varies in direct response to the intensity of the portion of subject image impinging on that cell, whereby, in use, each portion of said subject image is independently filtered by the cell on which it impinges so that a filtered subject image comprising the ensemble of said filtered subject image portions can be captured or viewed at said focal plane.

Preferably each cell comprises a body of liquid crystal material; and, a drive circuit for providing an electric field across said body of liquid crystal material to control the molecular alignment of said liquid crystal material, the strength of said electric field being directly dependant on the intensity of the portion of said subject image impinging on that cell.

Preferably said drive circuit includes a first component having an electrical characteristic which is variable in response to the intensity of the portion of said subject image impinging thereon for controlling the strength of said electric field.

Preferably said electrical characteristics is the impedance of said first component.

Preferably said drive circuit includes a second component connected with said first component to form a divider circuit wherein said electric field is generated from a point between said first and second components.

Preferably said second component is of fixed impedance.

Preferably said first component is made of a material having an impedance which varies in response to the intensity of electro magnetic radiation impinging thereon.

Preferably said material is configured in a convoluted path, or path of other configuration.

Preferably said divider circuit is a voltage divider circuit which divides a cell supply voltage between said first and second components to provide said electric field.

Preferably said supply voltage is common to all of said cells.

In order to provide sensitivity control, it is preferable that the supply voltage is variable.

Preferably each of said components with variable electrical characteristics is located in a central region of its respective cell. However, in an alternative embodiment, said components with variable electrical characteristics may be located in or adjacent the periphery of its corresponding cell.

Preferably each cell is bound and separated by a matrix of electrically conductive and insulating paths, said conductive paths supplying power to said cells. In one embodiment, said cells are bound and separated by a matrix of electrically conductive and insulating paths, said conductive paths supplying power to said cells and each of said components of variable electrical characteristics is disposed in or adjacent one of said paths.

In order that the matrix of paths on said filter are not sharply defined at the focal plane, it is preferable that said filter is displaced from said focal plane by such a distance that the matrix of paths is defocused at the focal plane. In this regard, in one embodiment it may be advantageous for the optical filter to further comprise a carriage means for supporting said matrix of cells and varying the distance of said matrix of cells from said focal plane. Further, the carriage means may be adapted to vary said distance in dependence of the focal length of a lens placed in said optical path in front of said matrix of cells. Alternately, or in addition thereto, the carriage means may further be adapted to vary said distance in dependence of the size of an opening of an aperture placed in said optical path in front of said matrix of cells.

Preferably said optical filter further comprises density control means for controlling the density of said subject image passing through said matrix of cells.

Preferably said density control means comprises a pair of polarising filters disposed on either side of said matrix of cells and in said optical path, wherein the plane of polarisation of one of said polarising filters can be varied relative to the plane of polarisation of said other polarising filter.

In one embodiment, said first polarising filter is rotatable relative to said second polarising filter whereby density control can be achieved by rotating said first polarising filter relative to said second polarising filter.

In an alternate embodiment one of said first and second polarising filters comprises an electrically controlled liquid crystal polariser whereby the degree of polarisation produced can be variably adjusted by adjustment of the strength of an applied electric field.

In accordance with a second aspect of the present invention there is provided an image capture or viewing device for capturing or viewing an image of a subject, said device comprising means for supporting said optical filter in an optical path between a subject, the image of which is to be captured or viewed by or through said device, and the focal plane of, or for, that device, said optical filter being in accordance with the first aspect of the invention described above.

Preferably said image capture or viewing device is in the form of a camera and comprises an image capturing medium disposed at said focal plane of said device.

Advantageously, when said optical filter is embodied within an image capture or viewing device, said carriage is further adapted to selectively move said matrix of cells into and out of said optical path.

BRIEF DESCRIPTION OF THE DRAWINGS

Embodiments of the present invention will now be described by way of example only, with reference to the accompanying drawings in which.

DETAILED DESCRIPTION OF PREFERRED EMBODIMENTS

Figure 1:
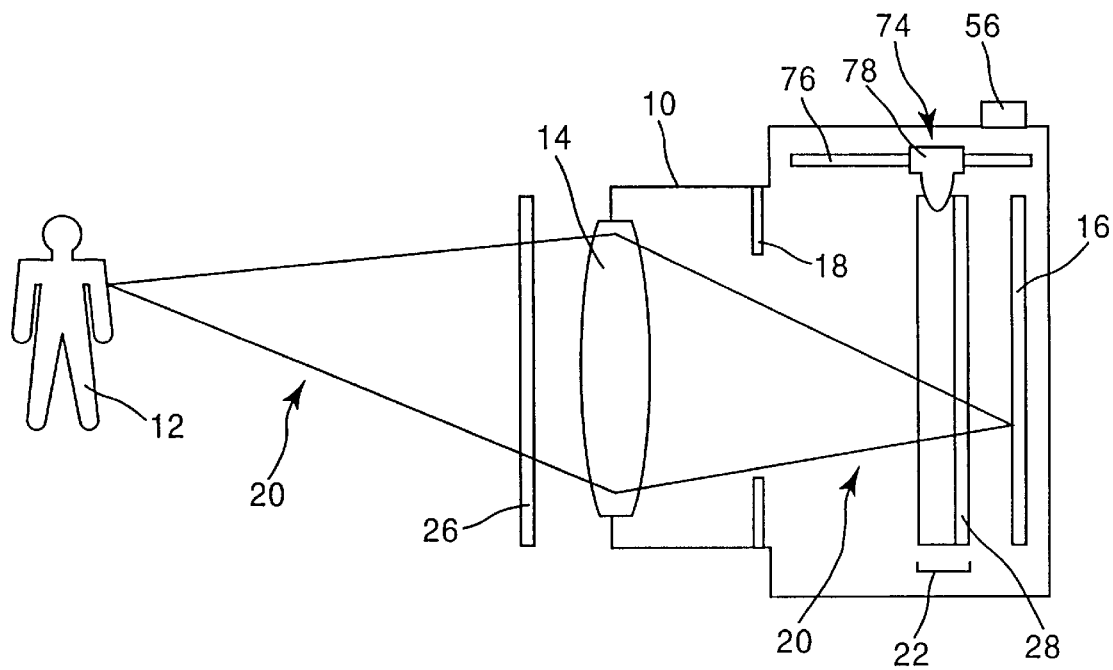
FIG. 1 is a representation of an image capture device incorporating the first embodiment of an electro-optical filter in accordance with the present invention.

FIG. 1 illustrates an image capturing device in the form of a camera 10 for capturing the image of a subject 12. The camera 10 is provided with a lens 14 for focusing an image of subject 12 onto focal plane 16 of the camera 10. An aperture 18 is disposed within the camera 10 between the lens 14 and focal plane 16. Typically, a recording medium such as photographic film is placed at the focal plane 16. Light emanating or reflected from the subject 12 travels in optical path 20 through lens 14, aperture 18 and onto the focal plane 16. Located in the optical path 20 between the subject 12 and focal plane 16 is the electro-optical filter 22.

As described in greater detail below, the electro-optical filter 22 comprises a matrix of independent cells 24 on which respective portions of the subject image impinging each cell having a transmissibility dependant on the intensity of the portion of the impinging subject image, so that each portion of subject image is independently filtered by the cell 24 on which it impinges and a filtered subject image comprising the ensemble of filtered subject image portions can be captured or viewed at the focal plane 16.

The electro-optical filter 22 also includes a density control device in the form of first and second polarising filters 26 and 28 respectively. The first filter 26 is rotatable relative to the second filter 28. The polarising filters 26 and 28 are located in the optical path 20 and are spaced by the matrix of cells 24.

Figure 2:
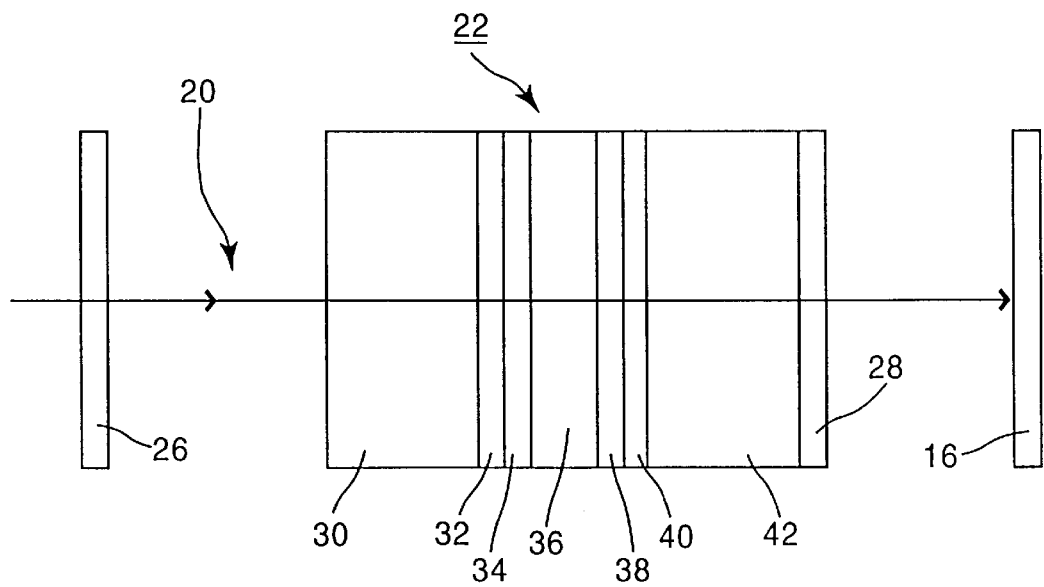
FIG. 2 is a cross sectional view of the electro-optical filter shown in FIG. 1.

FIG. 2 illustrates the electro-optical filter 22 in cross section. The electro-optical filter 22 is an active filter in the form of a directly photo addressed liquid crystal light valve. The filter 22 is constructed as a predominantly transmissive device whereby the subject image in optical path 20 passes therethrough in order to reach the focal plane 16.

The filter 22 includes a transparent glass substrate 30 which has fabricated onto its surface nearest the focal plane 16 an integrated circuit layer 32. The integrated circuit layer 32 is in the form of a two dimensional matrix of cell circuits each having a photo sensor, drive circuitry, liquid crystal electrode, and voltage supply rails.

Figure 5:
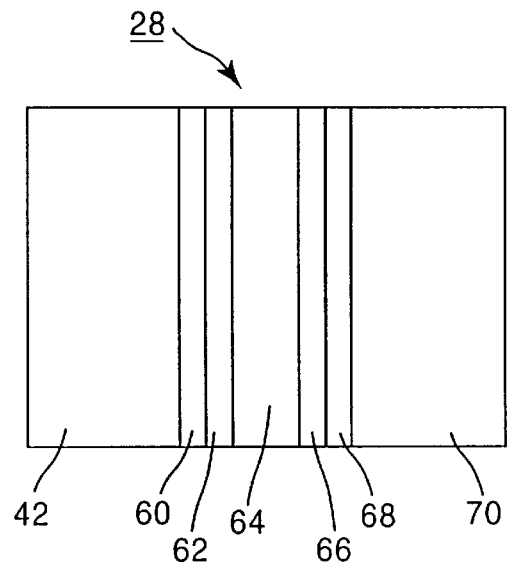
FIG. 5 is a cross sectional view of a density control means of a second embodiment of the electro-optical filter shown in FIGS. 1 to 3.

On the other side of the integrated circuit layer 32 is a body or volume of liquid crystal material 36 sandwiched between liquid crystal alignment layers 34 and 38. The purpose and function of the alignment layers 34 and 38 is well known in the art and therefore is not described in detail here. In this embodiment it is preferred that the liquid crystal body comprise a twisted nematic liquid crystal composition that therefore the alignment layers 34 and 38 be mutually perpendicular as shown in FIG. 5.

On an opposite side of the alignment layer 38 is a transparent glass substrate 42 having a transparent electrode 40 formed on the surface distant the focal plane 16. The second polarising filter 28 is formed as a film which is deposited on the opposite side of the glass substrate 42.

Figure 3:
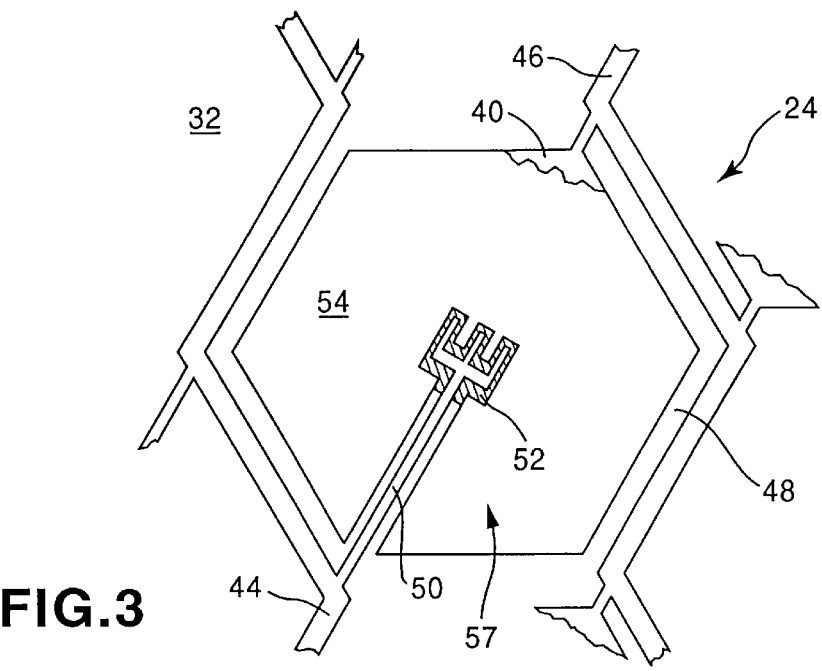
FIG. 3 is a schematic representation of a cell of the electro-optical filter shown in FIGS. 1 and 2.

FIG. 3 schematically represents one of the cells 24 in the matrix of cells and its drive circuit 57, parts of which are provided in the integrated circuit layer 32. Each drive circuit 57 includes conductive path 44 which functions as a supply voltage rails for respective cells 24 of the electro-optical filter 22. Adjacent cells 24 are separated by electrically non conductive or insulating paths 48. In each drive circuit 57, the rail 44 is provided with a branch 50 which extends to a first electrical component in the form of photodetector 52 which is disposed centrally within each cell 24. Typically the photodetector 52 is made of a cadmium sulphide material which has a resistance dependant on the intensity of light impinging thereon. The photodetector 52 acts as a voltage gate between the rail 44 and first liquid crystal electrode 54.

Figure 4:
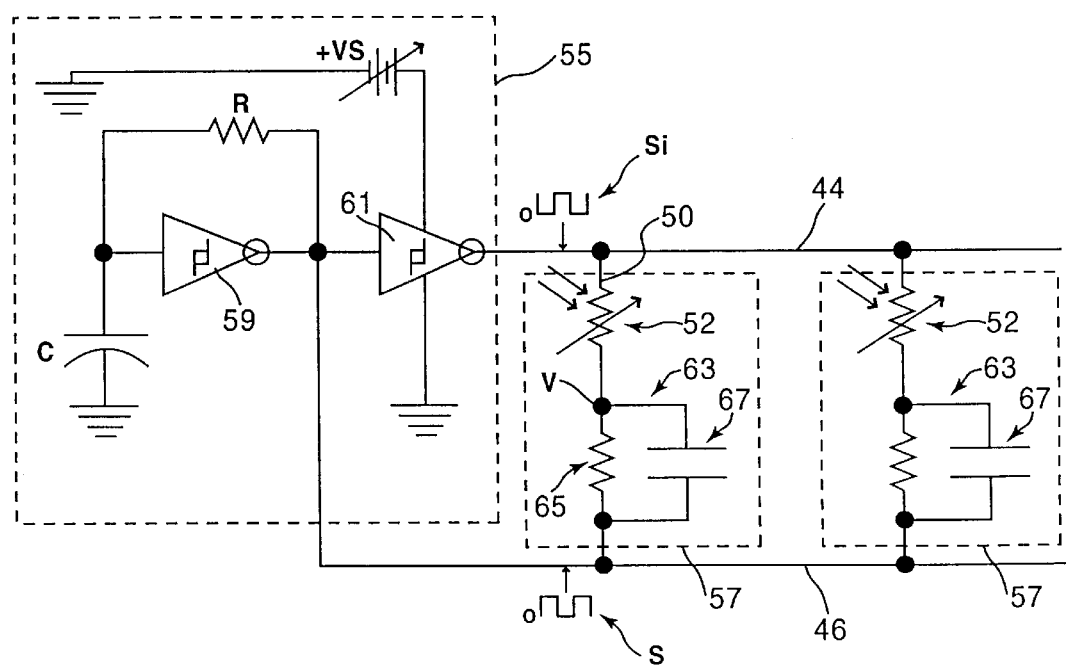
FIG. 4 is a circuit diagram representation of the cell circuit for the cell shown in FIG. 3.

FIG. 4 illustrates the voltage supply circuit 55 for the filter 22 together with the drive circuit 57 for two of the cells 24. The voltage supply circuit comprises a Schmitt inverter 59 connected as a free running oscillator and produces a square wave output S at approximately 100 Hz. The frequency of oscillation is set by the values of the resistor R and capacitor C. The output from inverter 59 is fed to another inverter 61 which produces an inverted square wave Si. Thus the voltage supply circuit 55 produces two anti-phase square waves S and Si which are used to power each cell 24 and its drive circuit 57. The amplitude of the square waves S and Si is dependent on the supply voltage Vs applied to the inverters 59 and 61.

Each drive circuit 57 comprises a photodetector 52 connected in series with its associated volume of liquid crystal material. The equivalent circuit of that volume of liquid crystal material can be considered as a second component 63 made of the parallel combination of a resistor 65 and capacitor 67. Thus, each drive circuit 57 in effect comprises a voltage divider circuit. Since the photodetector 52 has a resistance dependent on the intensity of the portion of the subject image impinging thereon, variations in the intensity of that portion of the subject image will alter the amplitude of the square wave drive voltage V at the junction of components 52 and 63 which is applied across that volume of liquid crystal material. Hence the optical properties and in particular the transmissibility of the cell 24 are varied in response to the intensity of the portion of th subject image impinging on the photodetector 52 of that cell. Further the sensitivity of each cell 24 to intensity of the subject image is dependent on the amplitude of the square wave drive voltage, S Si. Thus sensitivity of the cell 24 can be altered by varying the supply voltage Vs to inverters 59 and 61.

The transparent electrode 40 is common to each cell 24 and is in electrical connection with the voltage rail 46. Therefore, the strength of the electric field applied across the liquid crystal material 36 in any one cell 24 is dependant on the difference between voltage V and that at the supply rail 46.

The voltage supply rail 44, branch 50, and liquid crystal electrode 54 are all part of the integrated circuit layer 32 and can be formed by idium tin oxide metal vapour deposition.

Each cell 24 then, comprises a drive circuit 57, a volume of the liquid crystal material 36 underlying that cell and a further underlying portion of electrode 40. The liquid crystal material 36 is in the form of a single body. It is not necessary to provide separate individual bodies of liquid crystal material for each cell 24.

By adjustment of the supply voltage Vs an operator of camera 10 may determine which luminance zones in the subject image are to cause activation in each cell 24. Activation occurs when the voltage V is at a level sufficient to provide an electrical field which will cause rotation of the molecules or liquid crystal from a non activated or equilibrium state. The supply voltage Vs can be adjusted or varied via an external knob 56 placed on the exterior of the camera 10. Thus, the voltage V may be adjusted by the camera operator to provide different levels at which light incident upon the photodetector 52 of any one cell 24 will cause activation of the liquid crystal material of that cell. Cell activation in luminance zones of the subject image can be provided by adjusting the knob 56 to cause an effective increase in supply voltage Vs. The variation in supply voltage Vs thus provides sensitivity control contrast compression or expansion for the electro-optical filter 22.

The voltage supply Vs level may be set to a selection of predetermined values to provide cell activation in predetermined brightness zones of the subject image. In this way, the camera 10 can be preset to mask brightness areas over or under a predetermined value to reduce or expand respectively the contrast range of a subject 12 to a predetermined range.

As described above, density control means is provided to determine the amount of light reduction through cells in which the liquid crystal is activated. The density control can be provided by rotation of the first polarising filter 26 relative to the second polarising filter 28. These adjustments may be made by the operator of camera 10 physically rotating the first polariser 26. When polariser 26 is orientated perpendicular to polariser 28 a maximum density negative response is provided through the cells 24. When polarising filter 26 is rotated to be parallel with polarising filter 28, a maximum density positive response is provided through the cells 24. The first polarising filter 26 may be provided with an infinite rotation control or alternately provided with notched settings at positions which represent maximum through to minimum densities. The settings may be referenced on a bezel mounting of the rotatable polarising filter 26 as amounts of light reduction in "f stops" in fully activated areas of the cells 24.

Figure 6:
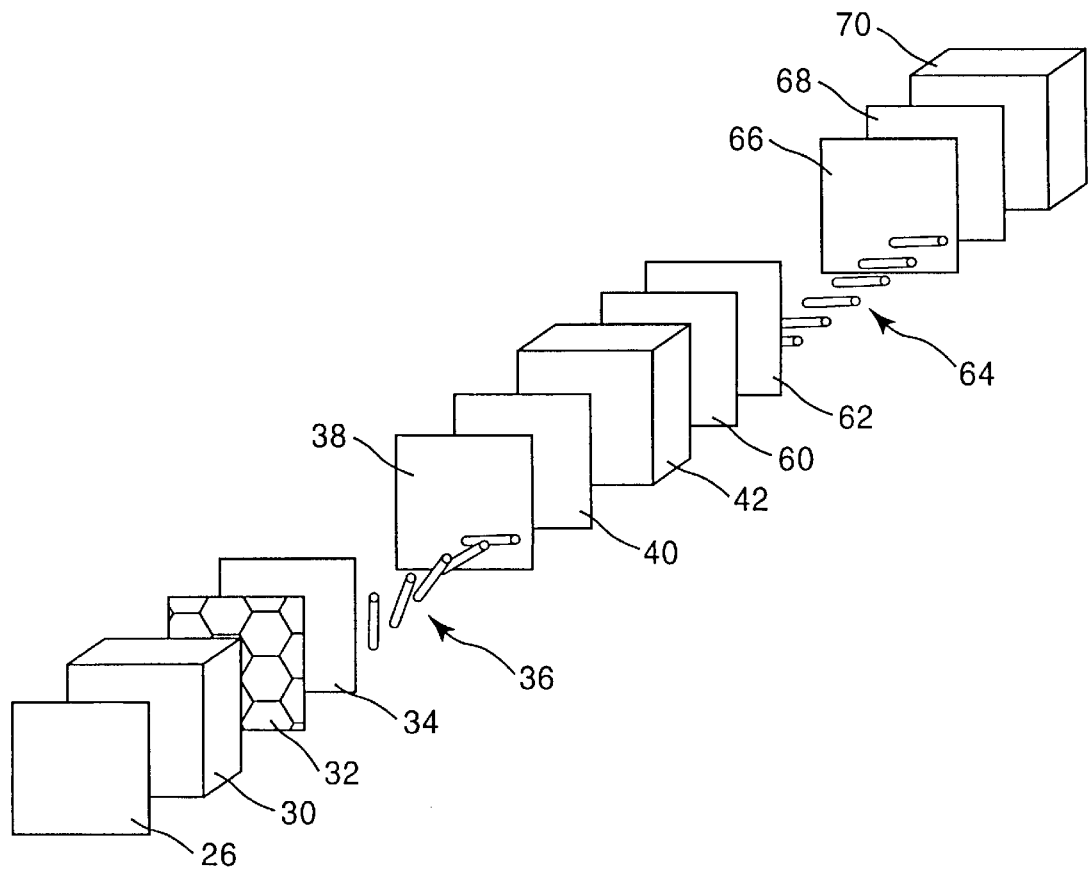
FIG. 6 is an exploded view of an electro-optical filter incorporating the density control means shown in FIG. 5.

An alternate structure for the second polarising filter 28 is shown in FIGS. 5 and 6. In this embodiment, the polarising filter 28 comprises: glass substrate 42, electrode 60, liquid crystal alignment layer 62, liquid crystal material 64, liquid crystal alignment layer 66, electrode 68, and glass substrate 70. The alignment layers 62 and 66 are orientated in the same direction and perpendicular to the angle of polarisation of the first polarising filter 26. The electrodes 60 and 68 made of transparent electrically conductive films. Voltage is applied to the electrodes 60 and 68 to create an electric field across the liquid crystal material 64. By allowing variation in the voltage applied, the degree of molecular alignment in the molecules of the liquid crystal material 64 can be varied. With no voltage applied, or a voltage below a maximum threshold level, the liquid crystal material acts as a polariser with an angle of polarisation perpendicular to that of first polarising filter 26. Thus a maximum overall polarising effect is produced by the combination of filters 26 and 28 giving maximum density to activated cells 24. With maximum voltage applied across the electrodes 60 and 68, the liquid crystal molecules are realigned thereby allowing maximum transmission of light. By varying the voltage between these two extremes an electrically variable density control is provided in the electro-optical filter 22.

It is known that the focal length of an image capture device such as a camera 10 is dependant on the focal length of the lens 14. In order to ensure that the matrix of paths 44, 46, 48 and 50 as well as any image of the photodetector 52 remains defocused at the focal plane 16 the optical filter 22 may also be provided with a carriage means 74 for supporting the matrix of cells 24 and allowing the position of the matrix of cells 24 to be varied relative to the focal plane 16. This can be achieved in numerous different ways. One way, as illustrated in FIG. 1, is to provide a rail 76 within the body of the camera 10 upon which a carriage 78 which supports the matrix of cells 24 can slide. The position of the carriage 78 along the rail 76 can be moved by means of an electric motor (not shown). The electric motor of the carriage 78 can be controlled so as to either allow continuous movement of the carriage along the rail 76 which may be stopped at will, or alternately to allow movement only to selected positions along the rail 76 dependant on the focal length of the lens 14. If it is desired to not use the electro-optical filter 22 the carriage 78 can also be controlled to flip the matrix of cells 24 up out of the optical path 20. This can be done in a similar manner as is already achieved in existing SLR cameras where mirrors are moved into and out of the optical path.

In addition to allowing movement of the matrix of cells 22 in dependence of the focal length of lens 14, the position may also be varied in accordance with the opening of aperture 18. This can simply be provided by means of an additional electronic circuit (not shown) which senses the aperture setting and in accordance therewith activates the motor of the carriage 78 to move the matrix of cells 24 to a predetermined position.

Figure 7:
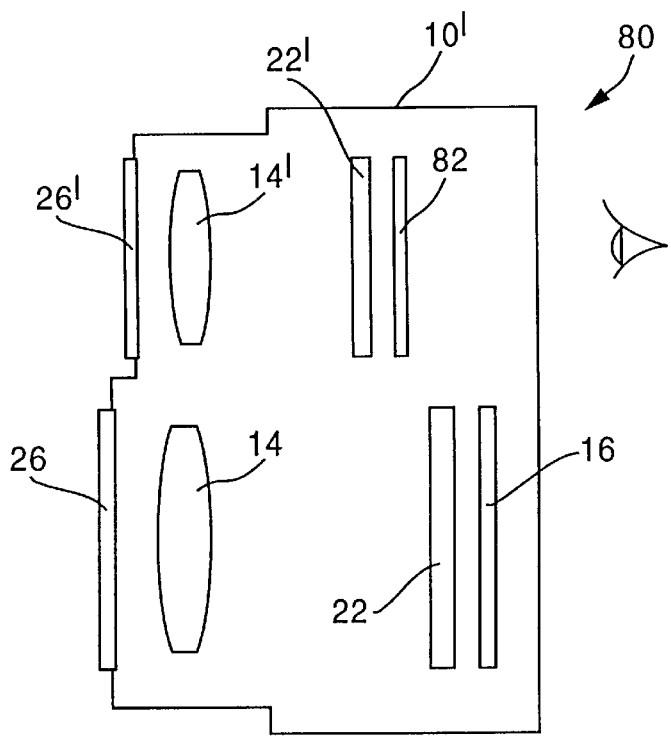
FIG. 7 is a schematic representation of a second embodiment of an image capture device incorporating the electro-optical filter in accordance with the present invention; and, FIG. 8 is a block diagram of an alternate cell circuit.

To allow a photographer to view the effect of the electro optical filter 22 prior to taking a photo, a camera 10' as shown in FIG. 7 can be provided with a second electro-optical filter 22' in a optical path of a viewfinder 80 of the camera 10'. The second electro-optical filter 22' is of the same configuration and provided with identical control to the first electro-optical filter 22. Further, the viewfinder 80 is provided with a lens 14' of identical or substantially similar characteristics to the lens 14. At the focal plane of the viewfinder 80 there is disposed a screen 82 onto which the subject image is focused. Similarly, when the filter 22 is installed in a conventional video camera the effect of the filter 22 on the subject can be previewed through the video camera viewfinder.

The operation of the electro optical filter 22 will now be described with reference to its application in camera 10.

The filter 22 is disposed in the optical path 20 between the subject 12 and focal plane 16 of the camera. The subject image initially passes through the first polarising filter 26, lens 14, and aperture 18 prior to impinging on glass substrate 30. Respective portions of the subject image then impinge on each cell 24. The voltage V produced for each cell 24 is dependant on the intensity of the part of the subject image portion which falls on the photo sensor 52 of that cell 24. If the intensity of that part of the subject image is sufficiently high, the resistance of the photo sensor 52 will reduce to a level to where the voltage V exceeds the threshold level required to cause activation of the liquid crystal material bound in the area between the electrodes 54 and 40 of that cell. The threshold level can be varied by turning knob 56 which varies the supply voltage to the cell. Depending on the degree of activation of the liquid crystal, the angle of polarisation of the portion of subject image passing through the liquid crystal material 36 of that cell 24 is rotated by varying degrees. The amount of the portion of subject image initially incident on a cell 24 that actually reaches the focal plane 16 is then dependant on the relative angle of polarisation of the portions of subject image passing through the glass substrate 62 and the polarisation angle of the second polarising filter 28.

Thus, if a subject image comprised a scene including detail in shadow and detail in direct light the supply voltage can be set to a level whereby the portions of subject image from the direct light zones cause activation of the liquid crystal material in the cells upon which they impinge. This will provide a darkened area that will filter the direct light. The degree of filtering can also be adjusted by use of the density control means. That is, by either rotating polarising filter 26 relative to polarising filter 28 or, for the embodiment shown in FIGS. 4 and 5, adjusting the supply voltage between electrodes 60 and 68.

Mid-tone areas between shadow and direct light may be filtered by adjusting the supply voltage to adjust the threshold level so that portions of the subject image in the mid-tone area can activate the liquid crystal material within the respective cells 24 of the electro-optical filter 22.

Thus, the electro-optical filter 22 can function as an active masking filter so as to selectively mask out highlight areas of a subject image when viewing or photographing the subject. The specific luminance zones which are masked can be varied by adjustment of the supply voltage using the knob 56. Additionally, the density of the masking effect can also be varied by relative angle adjustment of the first polarising filter 26, or in the case of the embodiment shown in FIGS. 5 and 6, adjustment of the electric field applied across liquid crystal body 64.

From the description, it will be apparent that an optical filter in accordance with the present invention has numerous advantages over the prior art. The electro-optical filter is directly addressed by the subject image itself and all active electronic components are integrated and configured onto the filter so as to be directly in the optical path of the subject image and accordingly there is no need for beam splitting and/or multiplexed signal addressing. Also, there is no need to superimpose a filtered image with the subject image as a result of the direct subject image optical addressing.

It follows from the above that there is a significantly smaller number of components required in embodiments of the present invention to produce a real time contrast modulation or masking filter by making unnecessary all multiplexed signal generating circuitry required in the prior art. Without the need for signal addressing componentry, smaller power supplies can be used thereby making embodiments of the present invention practical for application as a contrast control facility in small image capture and image viewing devices such as cameras, video cameras, binoculars, etc. Further, as the electro-optical filter is optically addressed, it enables the position of the filter in the optical path to be varied simply without optical alignment problems associated with prior art devices. Optical path position adjustment is necessary to compensate for subject light convergence angles which vary dependent on aperture settings and variations in focal length of a lens.

Now that an embodiment of the invention has been described in detail it will also be apparent that numerous modifications and variations may be made without departing from the basic inventive concepts. For example, the carriage means 74 is illustrated in FIG. 1 as being connected with the camera 10. However, in an alternate form, the carriage means 74 may be formed so as to be connectable with a range of lenses for the camera so that the filter 22 together with the carriage means 74 can be coupled with a lens and then retrofitted to a camera 10. If it is desired to change the lens to one of a different focal length, the carriage means 74 can then be disconnected from that lens and attached to another lens.

In addition, the cell circuit for each cell 24 is shown as being in the form of a basic resistive voltage divider. However, other types of circuits using different components which achieve the same effect can of course be used. The only requirement of the circuit is that it provides a variable voltage being dependent on the intensity of the subject image impinging a photosensitive component of the circuit. Thus, circuits with variable capacitors, photo diodes and/or thin film transistors and phototransistors can also be used to achieve the same effect.

Figure 8:
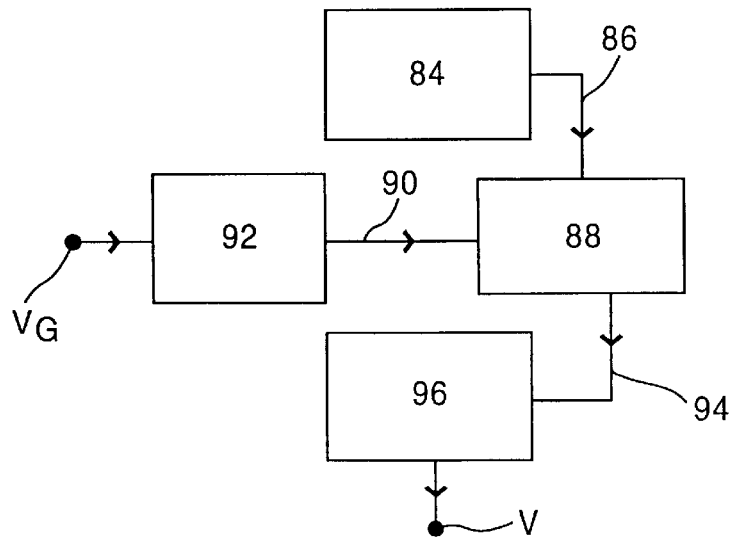

An example of an alternate configuration for the cell circuit for each cell 24 is shown in FIG. 8. In this embodiment, the photodetector is in the form of a phototransistor based circuit 84 rather than a light dependent resistor 52 as shown in the embodiment of FIG. 4. The phototransistor based circuit 84 provides an output voltage 86 proportional to the intensity of a portion of subject image incident thereon. The output voltage 86 is applied to a voltage control amplifier 88 which, under the control of voltage 90, may have an overall gain or loss. The control voltage 90 is obtained from a buffer amplifier 92 which has, as an input, a user adjustable gain control voltage Vg. The absolute value of the gain control voltage Vg determines the overall gain or loss of voltage controlled amplifier 88 and thus a magnitude of the voltage appearing at its output 94. The voltage on output 94 is then fed to a liquid crystal driving circuit 96 which, with reference to the embodiment of FIG. 4, produces an output voltage V that is applied across the liquid crystal of that cell.

The separate component blocks of this cell circuit namely the phototransistor based circuit 84, voltage controlled amplifier 88, buffer 92 and crystal drive circuit 94 can all be powered by a supply circuit, similar to the supply circuit 55 shown in FIG. 4 with the exception that the supply voltage Vs and thus the square wave drive voltages S and Si are of a fixed amplitude. Sensitivity control, which in effect is similar to that achieved by the adjustable supply voltage Vs in the embodiment of FIG. 4, is provided by way of the variable gain control voltage Vg in the cell circuit of FIG. 8. The gain control voltage Vg can be adjusted in an identical manner to the supply voltage Vs, that is via a user accessible knob 56 which typically may control a potentiometer coupled with a battery so as to provide a variable voltage.

It is envisaged that the cell circuit of FIG. 8 be physically formed and built up on substrate 30 in the circuit layer 32. This may be achieved using "silicon on glass" or "silicon on sapphire" technologies. These technologies are well known and therefore will not be described in great detail, suffice to say that in both cases a number of processing steps are involved such as chemical vapour deposition, thermal oxidisation, impurity doping, photo-resistant etching. "Silicon on sapphire" technology is preferred as fabrication is at higher temperatures than with "silicon on glass" technology and accordingly higher quality circuit components such as transistors can be formed. Nevertheless, "silicon on glass" technology is a viable option.

The cell circuit of FIG. 8 may made up from any suitable known silicon integrated circuit technology such as mMOS, pMOS, cMOS, Bipolar technology or BiCMOS. However, it is preferred that the circuit of FIG. 8 be fabricated in nMOS, with 2.5 micron technology.

While the optical filter has been described with reference to its use in a still camera 10 it may of course be used in other optical devices used in image viewing or capturing such as video cameras, microscopes, telescopes, binoculars, or as post production mask correction of contrast detail in photographic enlargers.

In yet another application the filter 22 may be integrated with a mechanical or LCD shutter to provide a contrast modulating shutter. Also the filter 22 may be provided as further layers of integration overlying a sensor array of a Charge Coupled Device. Additionally the filter 22 may be located at the focal plane of a image capture device in contact with a recording medium.

Also, although it is implied that the photodetector 52 is sensitive to the visible spectrum, there are many photodetectors sensitive to other parts of the electromagnetic spectrum that may be used to provide different effects to allow viewing of non-visible radiation. When the photodetectors are of an infrared sensitive material which responds to the infrared region of the electromagnetic spectrum, then the filter 22 can provide a visible response or image of an object radiating infrared radiation. In such an embodiment, the filter 22 can have application as a night vision device. An infrared image observation device, when provided with a backlit source containing no infrared light, will allow for observation of the infrared subject as a visible liquid crystal image at the focal plane. In the application filter 22 has a non-visible spectrum converter for an image capture device, a recorded image can be made by positioning the filter at the focal plane with a recording medium disposed at the focal plane and a light source within the camera operated so as to provide a contact exposure impression of the image appearing on the liquid crystal material of the filter 22 onto the recording medium.

All such modifications and variations are deemed to be within the scope of the present invention the nature of which is to be determined from the foregoing description and the appended claims.

I claim:

1. An electro-optical active masking filter for location between a subject and a focal plane in an optical path of a device for capturing, viewing or projecting an image of a subject, said filter comprising:

a matrix of cells of independently variable optical transmissibility on which respective portions of the subject image impinge, each cell being directly addressed by a portion of the image impinging thereon and having a planar front electrode overlying a planar back electrode, a body of liquid crystal material sandwiched between said front and back electrodes, and a drive circuit for providing an electric field between the front and back electrodes to control the molecular alignment of crystals in the body of liquid crystal material and thus the transmissibility of each cell;

the drive circuit being electrically connected to a supply voltage rail and having a first component having an electrical characteristic that varies in response to the intensity of the portion of the subject image impinging thereon, and a second component electrically connected to the first component to form a divider circuit, with the front electrode electrically connected to a point between the first and second components so that a potential difference can exist between the front and back electrodes depending on the voltage division between the first and second components;

so that the subject image is independently filtered by the cell on which it impinges to produce a filtered subject image comprising the ensemble of said filtered subject image portions.

2. A filter according to claim 1 wherein said second component is the body of liquid crystal material between front and back electrodes.

3. A filter according to claim 2 wherein said supply voltage rail provides a common supply voltage to all of said cells.

4. A filter according to claim 3 wherein said supply voltage is adjustable.

5. A filter according to claim 4 wherein adjacent ones of said cells are bound and separated by a matrix of electrically conductive and insulating paths, and wherein said conductive path is constituted by said supply voltage rail.

6. A device for the viewing, capture or projection of an image of a subject, said device comprising an aperture having an electro-optical active masking filter according to claim 5 whereby an image of the subject impinging at the focal plane of the device is acted upon by said filter prior to impinging on said focal plane.

7. A device according to claim 6 further comprising a carriage for selectively moving said filter into and out of the optical path of said device.

\* \* \* \* \*